United States Patent
Hagenbuch

[11] 3,751,112
[45] Aug. 7, 1973

[54] TAILGATE
[76] Inventor: Leroy G. Hagenbuch, 3910 Milbrook Road, Peoria, Ill. 61614
[22] Filed: June 17, 1971
[21] Appl. No.: 153,964

[52] U.S. Cl. ............................ 298/23 DF, 296/50
[51] Int. Cl. ......................... B60p 1/16, B60p 1/28
[58] Field of Search .................... 298/23 D, 23 DF, 298/6, 12; 296/26, 50, 28 D; 49/55

[56] References Cited
UNITED STATES PATENTS
2,153,798 4/1939 Grimes .................................. 49/55
2,330,614 9/1943 Ochsner ......................... 298/23 DF
2,439,585 4/1948 Snow .............................. 298/23 DF
3,254,919 6/1966 Birchmeier .................... 298/23 MD FOREIGN PATENTS OR APPLICATIONS
596,021 12/1947 Great Britain ....................... 298/23

Primary Examiner—Richard J. Johnson
Assistant Examiner—Reinhard Eisenzopf
Attorney—Frank E. Stevens

[57] ABSTRACT

An improved tailgate for a rear dump vehicle having a pair of side plates that are pivotally connected to the side sheets of a dump body. A telescoping rear plate is connected to the pivoted side plates that provides for expansion of the sidesheets of the dump body. A pair of telescoping outriggers are coupled between the side plates and the rear pump vehicle main frame that provides ease of assembly of the tailgate on a plurality of vehicles.

4 Claims, 4 Drawing Figures

PATENTED AUG 7 1973

INVENTOR

LeRoy G. Hagenbuch

PATENTED AUG 7 1973

3,751,112 ated in the load position. The rear dump vehicle in-
TAILGATE

BACKGROUND OF THE INVENTION

This invention relates in general to a rear dump vehicle, and more particularly, to an improved tailgate for use on a rear dump vehicle.

A rear dump vehicle generally includes a dump body supported by a main frame. The dump body generally includes a pair of side sheets connected to a bottom sheet and a front sheet to form a container generally having an open top and an open rear portion. The dump body is generally connected to the main frame by a body pivot pin. Accordingly, the dump body is loaded through the open top to a load capacity and the load is dumped or discharged through the rear portion by pivoting the dump body about the body pivot pin so that the front sheet of the dump body is raised and the rear portion of the dump body is lowered.

Without the use of a tailgate covering the rear portion of the dump body, the amount of load is limited because the loaded material can discharge through the open rear portion of the dump body while loading and particularly when the rear dump vehicle is traveling up an incline the load material may tend to spill out the rear portion of the dump body. Consequently, the addition of a tailgate to cover the open rear portion of the dump body for use when hauling and loading can increase the load capacity of the rear dump vehicles. Furthermore, the use of a tailgate can provide faster loading time by providing a larger area in which to load; for example, if a rear dump vehicle without a tailgate is used, the load must be dumped in the forward portion of the dump body to prevent spillage out the open rear portion. However, when a tailgate is used the length of the dump body becomes a dump target for loading the vehicle.

Furthermore, in large construction equipment such as mining equipment, the dump bodies of a rear dump vehicle are very large as compared to road vehicles. Consequently, the height of the side sheets and total overall size of the body are very large in comparison to small rear dump trucks for commercial use. Consequently, the side sheets may have a tendency to expand when large and especially high density loads are loaded in the dump body. Expansion of the side sheets can cause binding of the side sheets with the tailgate.

In the prior art, tailgates have been used on rear dump vehicles. Typical tailgates that have been used cover the open rear portion of the dump body and are either pivotally connected to the side sheets at or near the open rear portion of the dump body or pivotally connected to the side sheet at a position forward from the open rear portion. If a tailgate is used that pivots at a point near the upper position of the side sheets near the open rear portion, there can be an obstruction to the free flow of the loaded material. For example, some tailgates have a pivot rod extending between the side sheets at the top of the open rear portion of the dump body. A tailgate or plate is pivoted about the rod to close and open the rear portion of the dump body. Consequently, if dense, plastic-like material, such as clay, is loaded in the dump body, the pivot rod will interfere with the dumping of the load.

Tailgates in the prior art that have been connected to the side sheet at a position toward the open rear portion generally include a pair of side arms that are pivotally connected to the side sheets and connected to an outrigger on the main frame by a connecting means such as a chain.

Consequently, as the dump body is pivoted about the body pivot pin, the portion of the tailgate covering the rear portion of the dump body either remains stationary or pivots in a direction opposite to the dump body. Therefore, the loaded material is discharged under the rear plate of the tailgate. When material is loaded in the dump body, the side sheets of the dump body can expand under increased loads, and therefore the side sheets can bind with the tailgate and resist normal operation of the tailgate. Furthermore, in construction equipment a reasonable connecting place for the outrigger to be connected to the main frame is more difficult to locate. Prior art devices had the outrigger originally connected to the main frame at a fixed location. However, this has a disadvantage in large construction equipment because of the unaccessibility due to fuel tanks, cylinders and other equipment in standard located places for the outrigger.

SUMMARY OF THE INVENTION

In the present invention, a tailgate is disclosed having a pair of side plates that are pivotally connected to the side sheets of the dump body of the rear dump vehicle. The side plates are connected to a telescoping rear plate that provides expansion of the tailgate in response to expansion of the side sheets on the dump body of the vehicle. Each of the pair of side plates is pivotally connected to one of the side sheets of the dump body at a position on the side sheets that provides clearance between telescoping rear plate of the tailgate and the loaded material in the dump body when the load is being dumped.

Furthermore, an improved outrigger is provided that includes telescoping members that are adaptable to be connected to the main frame of a rear dump vehicle. The telescoping members of the outrigger provide ease of access of the outrigger to the main frame irrespective of fuel tank, cylinders and other components that may be located upon the main frame.

The above and other features and advantages of the present invention will become more readily apparent upon reference to the following detailed description when taken in conjunction with the accompanying drawings, in which:

DESCRIPTION OF THE PREFERRED EMBODIMENT

Figure 1:
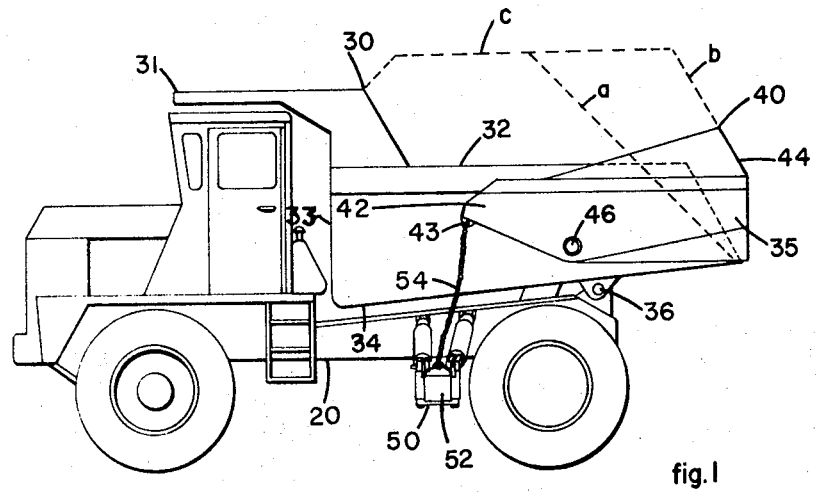
FIG. 1 is a sideview of a typical rear dump vehicle including the improved tailgate of the present invention and shown in the load position.

Referring now to the drawings wherein like reference characters designate like or corresponding parts, there is shown in FIG. 1 the typical rear dump vehicle illustrated in the load position. The rear dump vehicle includes a load body 30 having a pair of side sheets 32 (one sheet shown only), a front sheet 33 and a bottom sheet 34. Furthermore, some rear dump vehicles include a canopy 31 coupled to the load body 30. The canopy operates to protect a cab 29 when the rear dump vehicle is being loaded. The side sheets 32, the front sheet 33 and the bottom sheet 34 provide an open top wherein earth or other loaded material can be inserted in the load body 30. The load body is generally connected to the main frame 20 by a body pivot pin 36 so that the body can be rotated about the body pivot pin for dumping the load.

A tailgate 40 is illustrated having a pair of side plates 42 (one of which is illustrated only) and a rear plate 44 that are pivotally connected to the side sheets of 32 of the load body 30 by a tailgate pivot pin 46. Consequently, the tailgate can pivot about the pivot pin to provide both a dump position and a load position. The rear plate 44 of the tailgate 40 is illustrated as extending beyond the rear portion of a side sheet 32. Furthermore, the rear plate 44 is shown substantially perpendicular to a ground surface and a portion at a slight angle of inclination. Consequently, the rear plate 44 when in the load position provides an increased volume in which load material can be placed. The side plates 42 are pivotally connected to the side sheets by a tailgate pivot pin 46.

The side plate 42 of the tailgate 40 has a hole 43 therein in which a chain 54 is connected. The chain is also connected to an outrigger 50 by a connecting plate 52. The outrigger is in turn connected to the main frame 20.

Further illustrated in FIG. 1 by a line C and line A, is a relative load angle of a material without a tailgate. However, with the use of the present invention and the tailgate 40, the line C and the line B indicate the relative load capacity of the load body 30. As can be seen by the drawings, a substantially larger quantity of material to be loaded in the load body 30 can be loaded. Furthermore, as stated above, by having the rear plate 44 and the tailgate 40 extending beyond the rear portion of the side sheet 35, a load area greater than the normal load capacity of the load body 30 is provided.

Figure 2:
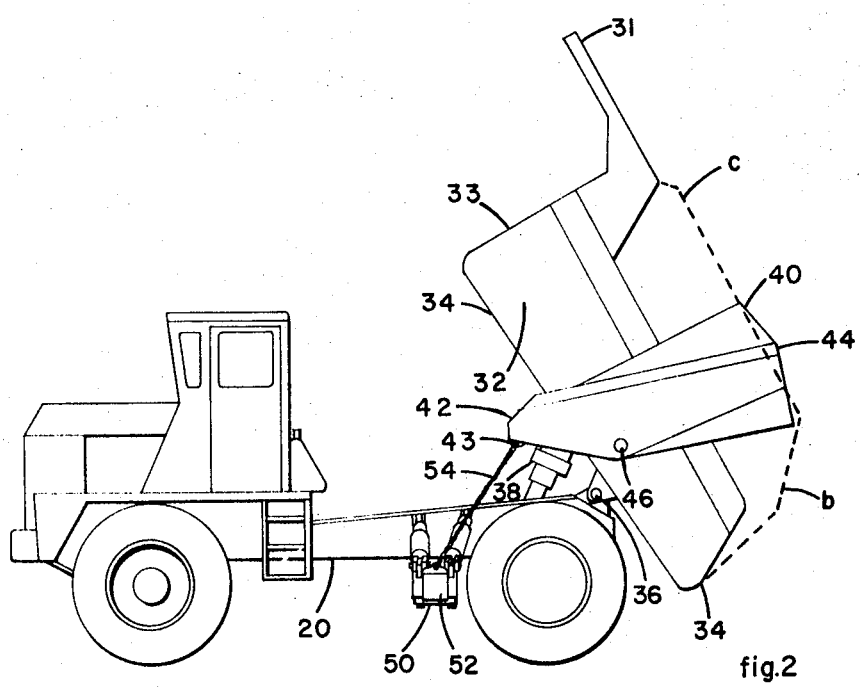
FIG. 2 is a sideview of the vehicle illustrated in FIG. 1 illustrating the rear dump vehicle in the dump position.

Referring now to FIG. 2, which illustrates a rear dump vehicle having the load body 30 in the dump position, the tailgate 40 illustrated in FIG. 1 and FIG. 2 is also shown in the dump position. As illustrated in FIG. 2, as the forward portion of the load body 30 is raised, such as the canopy is raised, the load body is pivoted about the body pivot pin 36 by a hoist cylinder 38. The chain 54 connected to the hole 43 in the side plate 52 of the tailgate and further coupled to the connecting plate 52 of the outrigger 50 provides tension on the side sheets causing the side plate 42 to be pivoted about the tailgate pivot pin 46. As illustrated in FIG. 2, the rear plate 44 is pivoted to a position to substantially clear the normal maximum load height of a load material in the load body 30. Consequently, any material on the bottom sheet 34 of the load body 30 can be discharged beneath the rear plate 44 of the tailgate 40 and through the rear portion of the side sheets 32. The tailgate pivot pin 46 can be located at any desired position relative to the side plate 42 of the tailgate 40 and the side sheets 32 of the load body. However, a desired position for the tailgate pivot pin would be in a position to cause a slight raising of the rear plate 44 of the tailgate 40. A slight raising of the rear plate 44 will provide increased clearance of the rear plate 44 and the loaded material.

It has been determined that the most desirable location for the tailgate pivot pin 46 is at a location upward from the bottom sheet 34 of the dump body, a distance to provide raising of the rear plate approximately one-fourth the width of the dump body over the top of the sidesheets 32 toward the rear of the dump body a distance to provide forward clearance of rear plate substantially equal to one-fourth the width of the dump body. Location of the tailgate pivot pin 46 in such a location provides a rotating motion of the surface of the rear plate 44 that is upwardly and over the load as opposed to cutting into the load. The clearance of the rear plate 44 relative to the loaded material is indicated by line C and line B in FIG. 2.

Consequently, it should be readily apparent to those skilled in the art that the present disclosed tailgate will increase the load capacity of any rear dump vehicle while also providing a dump operation without interfering with the dumping of the loaded material.

Figure 3:
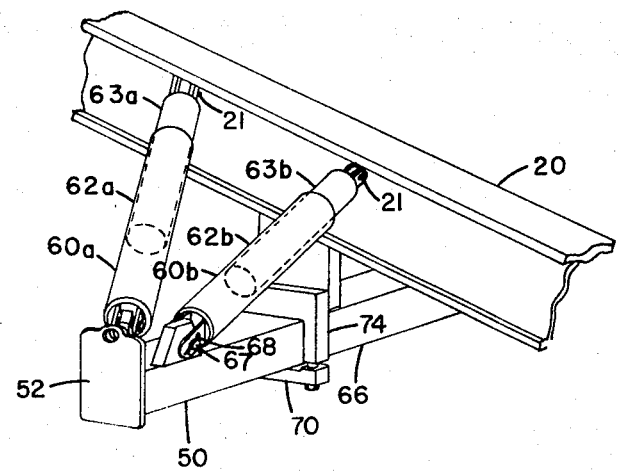
FIG. 3 is a pictorial view of the improved outrigger of the present invention.

Referring now to FIG. 3, where there is shown a pictorial view of an improved outrigger of the present invention, the outrigger 50 is shown connected to the main frame 20. The outrigger 50 includes a connecting support 66 which is connected to the main frame 20 by a clamp 70 which is bolted to a U support 74. The U support in turn in connected to the main frame. The U support can be connected to the main frame by any suitable means such as bolts or welded to the main frame 20. The outrigger further includes the pair of extendable members 60a and 60b each of which include an outer tubular member 62a and 62b and an inner tubular member 63a and 63b. Each of the extendable members 60a and 60b provide a telescoping adapting means for connecting support 66 to the main frame 20 at two other locations for providing rigidity of the outrigger 50. As illustrated in FIG. 3, the inner tubular members 62a and 62b are slidable in the outer tubular members 62a and 62b. Consequently, where uneven surfaces or positions in which the main frame with prior art devices would be unable to connect, the extendible members 60a and 60b can be adjusted for connecting the outrigger to the main frame 20.

The inner tubular supports 63a and 63b are shown connected to the main frame 20 by a connecting pin 21 insertable in a hole in an end of the inner tubular member 63a and 63b and through a hole in a portion of the main frame 20 connecting thereto. Also, the outer tubular members 62A and 62B are illustrated as being pinned to the connecting support 66 by a pin 67 which is inserted through a hole in one end of the outer tubular members 62a and 62b and through a hole in a raised portion of the connecting support. The pin 67 can be slidably fixed into position by means such as a cotter pin.

It should be readily apparent to those skilled in the art that the extendible members 60a and 60b could be placed into the appropriate position and then welded at both ends such as being welded to the connecting support and to the main frame 20. However, to provide maximum flexibility, the invention as illustrated is shown as having the extendible members 60A and 60B pivotable about the pins 67.

The connecting plate 52 illustrated in FIG. 1 is further illustrated as being connected on the end of the connecting support. The connecting plate can be welded or otherwise affixed to the connecting support 56. The connecting plate 52 is illustrated as having a hole therein for receiving a link of a chain for connecting the connecting plate to the side plate 42 of the tailgate 40.

Figure 4:
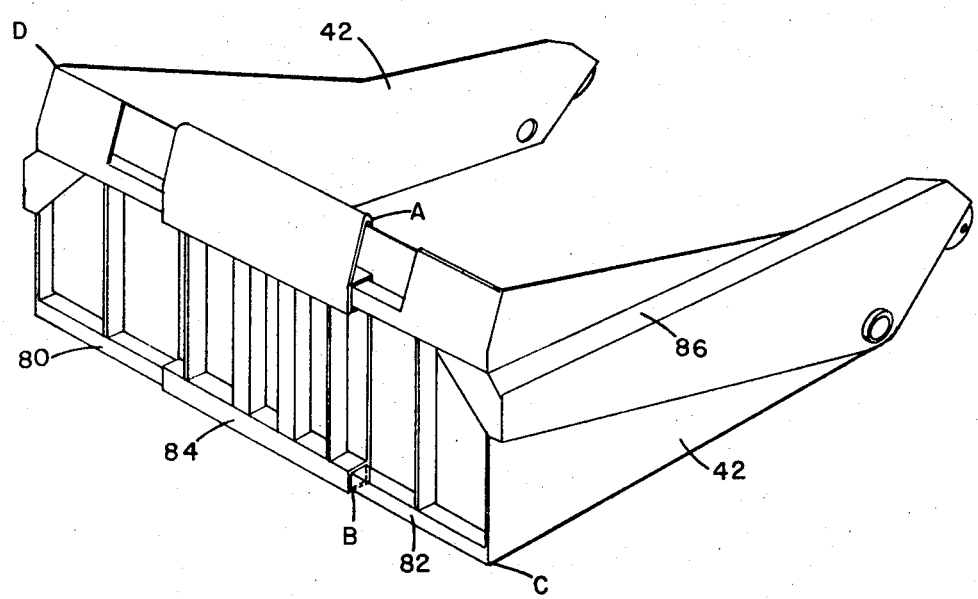
FIG. 4 is a pictorial view of the improved tailgate of the present invention.

Referring now to FIG. 4, there is shown a pictorial view of the tailgate 40 illustrated in FIG. 1 and FIG. 2, FIG. 4 illustrates in more detail the rear plate 44. The rear plate 44 includes a first outer section 80 and a second outer section 82. The first outer section 80 and the second outer section 82 are rigidly fixed to the side plates 35 such as at point C and point D. The first outer section 80 and the second outer section 82 are slidable into a hollow inner section 84 as illustrated at point A and point B. Accordingly, the inner section 84 is slidable either at the first outer section 80 or in the direction of the second outer section 82 as indicated by the arrow. Accordingly, as the side sheets 33 of the load body 30 expand and contract, the side plates 32 will expand and contract in response to expansions of the load body. Accordingly, the first outer section and the second outer section 82 will slide in a direction away from the NCAR section 84 to prevent binding of the side plate 42 with the side sheet 32 of the load body 30.

Consequently, the tailgate 40 illustrated in FIG. 4 prevents binding of the side plate 42 with the side sheet 32 of the load body 30. In prior art devices where a non-extensible or telescoping type tailgate was used, the side sheet 32 could bind with the side plate 42 of tailgate if similar size tailgate were to be used and hence the tailgate 40 would either be damaged with attempting to lift the tailgate 40 or it would break the chain 54 illustrated in FIG. 1 and the tailgate would not raise at all. Accordingly, the present invention has the advantage of the telescoping type tailgate for preventing both damage to a vehicle and to the tailgate.

While the salient features of the present invention have been illustrated and described with respect to a particular embodiment, it should be readily apparent that modifications can be made within the spirit and scope of the invention.

What is claimed is:

1. In a rear dump vehicle of the type having a main frame and a pair of side sheets, a bottom sheet and a forward sheet that form a dump body, an improved tailgate, comprising
   a pair of side plates being pivotally connected to the side sheets of the dump body, each of the pair of side plates having a first end and a second end,
   a telescoping rear plate coupled between the second ends of each of the pair of side plates, said telescoping rear plate provides for expansion of the tailgate in response to expansion of the side sheets of the dump body,
   a pair of outriggers, each of the pair of outriggers being connected to the main frame of the rear dump vehicle for providing a means for connecting the first end of each of the pair of side plates to the main frame, and
   a pair of connecting means, each of the pair of connecting means being coupled between the first end of one of the pair of side plates and one of the pair of outriggers for maintaining substantially a constant distance between individual ones of the outriggers and individual ones of the pair of side plates and for providing rotation of said rear plate in response to counter rotation of the dump body.

2. The improved tailgate of claim 1 wherein each of the pair of outriggers further include,
   a plurality of telescoping members adapted to be connected to the main frame of the rear dump vehicle for providing flexibility of attachments, and
   means for securing each of the plurality of telescoping members to a fixed position.

3. The improved tailgate of claim 1 that further includes,
   a pair of tailgate pivot pins, each of the pair of pivot pins being connected to a side sheet of the dump body and rotatably coupled to individual ones of the pair of side plates and being located on the side sheet in a position to provide clearance of the telescoping rear plate above the side sheets a distance substantially equal to one-fourth the width of the dump body, and to provide clearance of the telescoping rear plate a distance substantially equal to one-fourth the width of the dump body when the dump body is in a dump position.

4. The improved tailgate of claim 2 that further includes,
   a pair of tailgate pivot pins, each of the pair of pivot pins being connected to a side sheet of the dump body and rotatably coupled to individual ones of the pair of side plates and being located on the side sheet in a position to provide clearance of the telescoping rear plate above the side sheets a distance substantially equal to one-fourth the width of the dump body, and to provide clearance of the telescoping rear plate a distance substantially equal to one-fourth the width of the dump body when the dump body is in a dump position.

* * * * *